Patented Oct. 22, 1946

2,409,948

UNITED STATES PATENT OFFICE 2,409,948

POLYMERIC MATERIALS

Elmore Louis Martin, Wilmington, Del., assignor to E. I. du Pont de Nemours & Company, Wilmington, Del., a corporation of Delaware No Drawing. Application March 1, 1945,
Serial No. 580,491

6 Claims. (Cl. 260—86)

This invention relates to polymeric materials and more particularly to polymers obtained from halogenated ethylenes.

This invention has an an object new and useful compositions of matter. A further object is the preparation of valuable high molecular weight polymers comprising fluorinated ethylenes. A still further object is the preparation of polymers comprising tetrafluoroethylene and vinyl fluoride having greater solubility in organic solvents and improved workability. Other objects will appear hereinafter.

These objects are accomplished by polymerizing in the manner more fully described below a mixture of a perhaloethylene containing at least two fluorine atoms, vinyl fluoride, and a hydrogen-containing halogenated ethylene other than the vinyl fluoride.

I have found that polymers can be obtained from the above mentioned ingredients which are of particular value in many industrial applications by reason of their clarity and solubility in conjunction with high tensile strength, nonflammability, and other desirable properties.

The invention is most advantageously carried out when the mixture of copolymer ingredients is composed of tetrafluoroethylene, vinyl fluoride, and vinyl chloride. The tetrafluoroethylene can, however, be replaced by other perhaloethylenes, that is by other completely halogenated ethylenes in which at least two of the halogen atoms are fluorine. The vinyl chloride can be replaced by various hydrogen-containing halogenated ethylenes other than vinyl fluoride. The vinyl fluoride is specifically a necessary component in the present copolymers.

In order to obtain the desired balance between preservation to the greatest extent of the properties of stiffness, melting point, tensile strength, solubility and clarity, and sacrific of one or more of these properties, each of the mentioned copolymer ingredients must be present in the composition to the extent of at least 5%. The polymerization reaction is conducted under superatmospheric pressure, generally autogenous pressure, and elevated temperature in the presence of a small amount of a peroxy compound as catalyst.

The invention is illustrated by the following examples wherein parts are by weight.

EXAMPLE 1

A stainless steel high-pressure reactor is charged with 50 parts of tert.-butyl alcohol, 150 parts of deoxygenated water, 0.3 part of benzoyl peroxide and 0.3 part of hydrated disodium phosphate. The reactor is closed, evacuated, cooled in a solid carbon dioxide/methanol mixture, and is further charged with 10 parts of vinyl chloride, 60 parts of vinyl fluoride and 30 parts of tetrafluoroethylene. The reactor is agitated and heated to 75° C. while maintainng an internal pressure within the range of 3,000–32,000 lb./sq. in. by periodic injection into the reactor of deoxygenated water. The sum of the individual pressure drops during the heating period of 9.1 hours is 5400 lb./sq. in. The reactor is cooled to room temperature, the unreacted portion of the gaseous monomers bled off, and the contents of the reaction tube are discharged. There is obtained 42 parts of a copolymer which contains 43.4% fluorine and 8.67% chlorine which corresponds to a tetrafluoroethylene/vinyl fluoride/vinyl chloride copolymer having a tetrafluoroethylene content of 25%, and a vinyl fluoride content of 60% and a vinyl chloride content of 15%, or a mole ratio of tetrafluoroethylene/vinyl fluoride/vinyl chloride of 1:5.4:1. Films cast from an acetone solution (25% copolymer), have tensile strengths of 4850 lb./sq. in. at an elongation of 460%, a modulus of elasticity of $0.136 \times 10^6$ lb./sq. in., a tack temperature (the temperature at which the film shows a tendency to stick to a highly polished surface) of 115–120° C. and a temperature of zero tenacity of 135° C. The copolymer is nonflammable and is soluble in acetone, methyl ethyl ketone, ethyl acetate and halogenated hydrocarbons. It is insoluble in alcohols, ethers, and aliphatic and aromatic hydrocarbons.

EXAMPLE 2

A stainless steel pressure reactor is charged with 200 parts of deoxygenated water and 0.3 part of benzoyl peroxide. The reactor is closed, evacuated, cooled in a solid carbon dioxide/methanol mixture, and is then further charged with 25 parts of vinyl fluoride, 45 parts of tetrafluoroethylene, and 30 parts of vinylidene fluoride. The reactor is then agitated and heated to 80° C., the pressure being maintained in the range of 2400–2600 lb./sq. in. by the periodic injection of deoxygenated water. After heating for 10.2 hours the sum of the individual pressure drops is 1600 lb./sq. in. The reactor is then cooled and discharged. There is obtained 34 parts of a copolymer of tetrafluoroethylene/vinyl fluoride/vinylidene fluoride which is soluble in acetone to the extent of 23%. Films cast from an acetone solution have tensile strengths of 5000 lb./sq. in. at an elongation of 440%, a modulus of elasticity of $0.101 \times 10^6$ lb./sq. in., a tack temperature of 160–

165° C., and a temperature of zero tenacity of 178° C. The copolymer is nonflammable and is soluble in acetone, methyl ethyl ketone, ethyl acetate, and halogenated hydrocarbons. It is insoluble in alcohol, ether and aliphatic and aromatic hydrocarbons.

The ready selection of the most desirable copolymers for a particular use is facilitated by the table inserted herein which shows the physical properties of a number of these copolymers:

*Table*

| Tetrafluoroethylene | Vinyl fluoride | Vinyl chloride | Tack temp. | Temp. of zero ten. | Modulus of elasticity×10⁶ | Yield point | Ten. | Elong. | Clarity of films |
|---|---|---|---|---|---|---|---|---|---|
| *Per cent* | | | *° C.* | *° C.* | *Lbs./sq. in.* | *Lbs./sq. in.* | *Lbs./sq. in.* | *Per cent* | |
| 5 | 69 | 26 | 45-50 | 68 | 0.062 | 1,850 | 2,000 | 150 | Excellent. |
| 7 | 22 | 71 | 40-45 | 82 | 0.260 | 3,120 | 3,120 | 10 | Hazy. |
| 7 | 35 | 58 | 35 | 50 | 0.219 | 3,420 | 3,420 | 10 | Good. |
| 9 | 68 | 23 | 70-75 | 124 | 0.098 | 2,860 | 2,900 | 220 | Excellent. |
| 11 | 52 | 37 | 40-45 | 61 | 0.032 | 1,720 | 1,800 | 10 | Excellent. |
| 14 | 54 | 32 | 50-55 | 78 | 0.097 | 2,660 | 2,700 | 80 | Fair. |
| 20 | 51 | 29 | 35-40 | 88 | 0.134 | 3,550 | 3,600 | 60 | Excellent. |
| 21 | 48 | 31 | 60-65 | -------- | 0.030 | 1,840 | 2,550 | 380 | Good. |
| 23 | 55 | 22 | 85-90 | 180 | 0.145 | 3,800 | 3,850 | 10 | Fair. |
| 25 | 60 | 15 | 115-120 | 135 | 0.136 | 3,800 | 4,850 | 460 | Do. |
| 33 | 40 | 27 | 50-55 | 100 | 0.002 | 1,400 | 3,410 | 420 | Good. |
| 36 | 37 | 27 | 40-45 | 90 | 0.094 | 2,640 | 2,870 | 350 | |
| 36 | 43 | 21 | 80-85 | 126 | 0.147 | 3,880 | 4,710 | 400 | Excellent. |
| 55 | 25 | 20 | 130-135 | 172 | 0.112 | 3,480 | 7,250 | 465 | Fair. |
| 60 | 2 | 38 | 70-75 | 126 | 0.090 | 3,160 | 3,720 | 410 | Good. |

Suitable perhaloethylenes in addition to tetrafluoroethylene which contain at least two fluorine atoms include chlorotrifluoroethylene, bromotrifluoroethylene, 1,1-dichloro-2,2-difluoroethylene and 1,2-dichloro-1,2-difluoroethylene. Hydrogen-containing halogenated ethylenes in addition to vinyl chloride and vinylidene fluoride include vinyl bromide, vinylidene chloride, 1-chloro-1-fluoroethylene, 1,1-difluoro-2-chloroethylene and trifluoroethylene.

The copolymers having the most valuable properties are those obtained from mixtures consisting of 20% to 50% tetrafluoroethylene, 25% to 75% vinyl fluoride, and 5% to 30% of the hydrogen-containing halogenated ethylene other than the vinyl fluoride. Within this range the proportions best for particular purposes will vary somewhat. Thus where stiffness is a consideration the preferred compositions contain 20%-45% tetrafluoroethylene, 50%-75% vinyl fluoride, and 5% to 30% of the other hydrogen-containing halogenated ethylene. For applications where tack temperature is of first importance, the best results are obtained with compositions containing 20%-50% tetrafluoroethylene, 25%-75% vinyl fluoride and 5%-20% of the other hydrogen-containing halogenated ethylene. Where the tensile strength is of primary importance, compositions containing 20%-50% of the tetrafluoroethylene, 45%-70% of vinyl fluoride and 5%-25% of the hydrogen-containing halogenated ethylene are the preferred. For applications where tack temperature, stiffness and tenacity are of first importance, compositions containing 20%-45% of tetrafluoroethylene, 50%-70% of vinyl fluoride, and 5%-20% of the hydrogen-containing halogenated ethylene are used because these compositions possess the higher stiffness, tack temperature and tenacity values.

Although the examples illustrate the polymerization of a monomeric mixture in the presence of water, it is possible to carry out the reaction in an organic solvent instead of water. In general, it is preferred to carry out the polymerization in the presence of water or water-organic solvent mixtures inasmuch as better results can be obtained, since when organic solvents alone are used, the products are in general characterized by lower molecular weights.

The catalysts used in the practice of this invention are peroxy compounds, i. e., those compounds which contain an —O—O— linkage. Examples of such catalysts are diacyl peroxides, such as benzoyl peroxide and lauroyl peroxide, dialkyl peroxides, such as diethyl peroxide, and inorganic peroxy compounds such as ammonium persulfate, potassium persulfate, potassium percarbonate, potassium perphosphate, sodium perborate and hydrogen peroxide.

The polymerization is conducted generally at temperatures within the range of 40-200° C., depending upon the type of catalysts used. With diacyl peroxide catalysts, temperatures ranging from 80-120° C., with persulfate catalysts 20-100° C., and with dialkyl peroxide catalysts 100-150° C. are generally used. The polymerization can be carried out at pressures above atmospheric, generally within the range of 500-5000 lb./sq. in. and preferably within the range of 1500-4000 lb./sq. in.

The products of this invention are characterized by good solubility and excellent clarity. They are further characterized by having the valuable combination of properties which include good tensile strength, relatively high softening temperature, high modulus of elasticity, low water absorption and nonflammability. Copolymers of this invention are therefore particularly suitable for use as a base for photographic and X-ray films and in coating compositions, wrapping films and industrial fibers. They can be molded into various shaped articles and can be extruded in the form of fibers, films, etc. These copolymers are also valuable for coating wire in the manufacture of electrically insulated conductors. For many of these purposes the polymer may be combined with or prepared in the presence of plasticizers, stabilizers, fillers, pigments, dyes, softeners, natural resins or synthetic resins.

As many widely different embodiments of this invention may be made without departing from the spirit and scope thereof, it is to be understood that this invention is not to be limited to the specific embodiments thereof, except as defined in the appended claims.

I claim:

1. A composition of matter comprising the copolymerization product of a mixture of a perhaloethylene containing at least two fluorine atoms, vinyl fluoride, and a hydrogen-containing halogenated ethylene other than vinyl fluoride, said mixture containing each of said perhaloethylene, vinyl fluoride and hydrogen-containing halogenated ethylene other than vinyl fluoride in an amount of at least 5% by weight, the halogen contained in said perhaloethylene and in said hydrogen-containing halogenated ethylene being selected from the group consisting of chlorine, bromine, and fluorine.

2. A composition of matter comprising the copolymerization product of a mixture of tetrafluoroethylene, vinyl fluoride, and a hydrogen-containing halogenated ethylene other than vinyl fluoride, said mixture containing each of said tetrafluoroethylene, vinyl fluoride and hydrogen-containing halogenated ethylene other than vinyl fluoride in an amount of at least 5% by weight, the halogen contained in said perhaloethylene and in said hydrogen-containing halogenated ethylene being selected from the group consisting of chlorine, bromine, and fluorine.

3. A composition of matter comprising the copolymerization product of a mixture of tetrafluoroethylene, vinyl fluoride, and vinyl chloride, said mixture containing each of said tetrafluoroethylene, vinyl fluoride, and vinyl chloride in amount of at least 5% by weight.

4. A process for obtaining copolymers which comprises heating at 40°–200° C. under autogenous pressure in the presence of a peroxy catalyst a mixture of a perhaloethylene containing at least two fluorine atoms, vinyl fluoride, and a hydrogen-containing halogenated ethylene other than vinyl fluoride, said mixture containing each of said perhaloethylene, vinyl fluoride and hydrogen-containing halogenated ethylene other than vinyl fluoride in an amount of at least 5% by weight, the halogen contained in said perhaloethylene and in said hydrogen-containing halogenated ethylene being selected from the group consisting of chlorine, bromine, and fluorine.

5. A process for obtaining copolymers which comprises heating in the presence of a peroxy catalyst at 40° C. to 200° C. under autogenous pressure a mixture of tetrafluoroethylene, vinyl fluoride, and a hydrogen-containing halogenated ethylene other than vinyl fluoride, said mixture containing each of said tetrafluoroethylene, vinyl fluoride, and hydrogen-containing halogenated ethylene other than vinyl fluoride in amount of at least 5% by weight, the halogen contained in said perhaloethylene and in said hydrogen-containing halogenated ethylene being selected from the group consisting of chlorine, bromine, and fluorine.

6. A process for obtaining copolymers which comprises heating in the presence of a peroxy catalyst at 40° C. to 200° C. under autogenous pressure a mixture of tetrafluoroethylene, vinyl fluoride, and vinyl chloride, said mixture containing each of said tetrafluoroethylene, vinyl fluoride, and vinyl chloride in amount of at least 5% by weight.

ELMORE LOUIS MARTIN.